(12) United States Patent
Klein

(10) Patent No.: US 7,096,151 B2
(45) Date of Patent: Aug. 22, 2006

(54) METHOD FOR DETECTING TAMPERING

(75) Inventor: Rudolph J. Klein, Centerville, OH (US)

(73) Assignee: Paxar Americas, Inc., Miamisburg, OH (US)

( * ) Notice: Subject to any disclaimer, the term of this patent is extended or adjusted under 35 U.S.C. 154(b) by 0 days.

(21) Appl. No.: 10/935,385

(22) Filed: Sep. 7, 2004

(65) Prior Publication Data

US 2006/0052981 A1    Mar. 9, 2006

(51) Int. Cl.
*G01G 7/00*  (2006.01)
*G01G 9/00*  (2006.01)
*G01G 11/00* (2006.01)
*G01G 17/00* (2006.01)
*G01G 19/00* (2006.01)

(52) U.S. Cl. ..................................................... 702/173

(58) Field of Classification Search ................. 702/173
See application file for complete search history.

(56) References Cited

U.S. PATENT DOCUMENTS

| | | | | |
|---|---|---|---|---|
| 5,908,283 A | * | 6/1999 | Huang et al. | 414/801 |
| 2004/0193438 A1 | * | 9/2004 | Stashluk et al. | 705/1 |
| 2005/0004702 A1 | * | 1/2005 | McDonald | 700/213 |

* cited by examiner

*Primary Examiner*—John Barlow
*Assistant Examiner*—Sujoy Kundu

(57) ABSTRACT

There is disclosed method of detecting tampering with product packages, using an RFID transponder on the package, wherein the weight before shipment is encoded into the RFID transponder, and the received package is weighed and its RFID transponder is decoded upon receipt of the package, and a comparison of the two weights will indicated tampering or the likelihood of tampering if the weights are outside allowable limits.

8 Claims, 2 Drawing Sheets

METHOD FOR DETECTING TAMPERING

BACKGROUND OF THE INVENTION

1. Field of the Invention

This invention relates to a method for detecting tampering.

2. Brief Description of the Prior Art

A prior art method for a customer to determine whether goods received correspond to goods that were shipped involve, in one example, manually inspecting the printed information on the outside of each individual package and comparing that to the purchase order or invoice information to confirm that the goods received correspond to the goods that were ordered and/or invoiced. In the event the goods are loaded onto a pallet and shrink wrapped, the customer would unpack the pallet and perform the above-mentioned comparison. It is also known to provide a load of palletized packages wherein the pallet and the package or packages are shrink wrapped into a unit and to have a shipping label applied to the shrink wrap. Such a shipping label has been provided with an RFID transponder encoded with shipping data. Typical shipping data comprises the shipper's return address, the carrier's information, the ship-to location, the postal code, the purchase order number, the product name, and the serial shipping container or product package number.

SUMMARY OF THE INVENTION

The invention relates to an improved method of indicating whether or not a product or a package was tampered with during shipment.

One specific embodiment of the invention includes weighing a packaged product, providing a pressure sensitive label having an RFID transponder, printing shipping data on the label and encoding the RFID transponder with the shipping package weight, applying the label to the product or its packaging, shipping the packaged product to the customer, weighing the packaged product after delivery to the customer, decoding the shipping package weight in the RFID transponder, and comparing the shipping package weight decoded from the RFID transponder with the received package weight to indicate tampering when the difference between the shipping package weight and the received package weight is outside allowable limits.

BRIEF DESCRIPTION OF THE DIAGRAMMATIC DRAWINGS

DETAILED DESCRIPTION OF THE PREFERRED EMBODIMENTS

Figure 1:
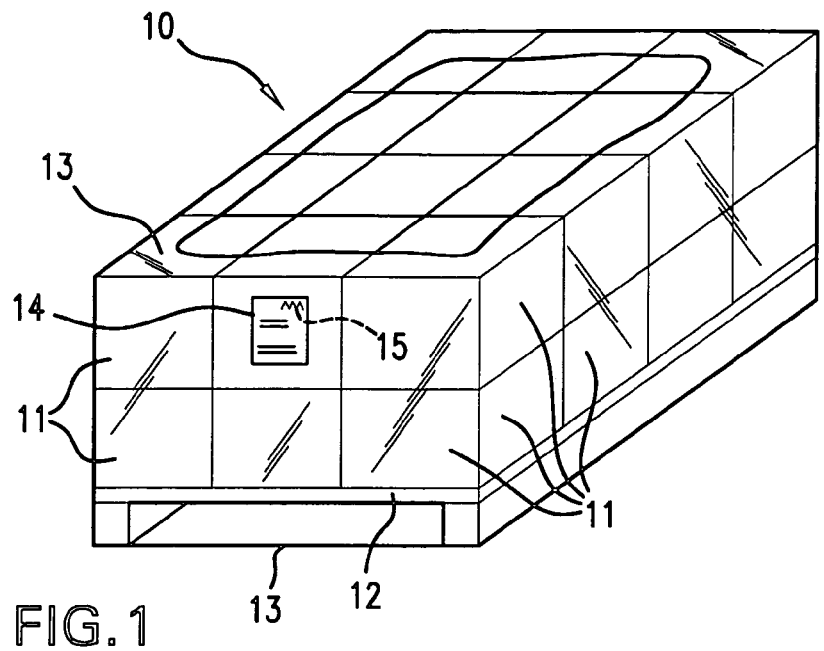
FIG. 1 is a perspective view of packages on a pallet with an applied shipping-data-bearing label having an RFID transponder encoded with shipping weight data.
Figure 2:
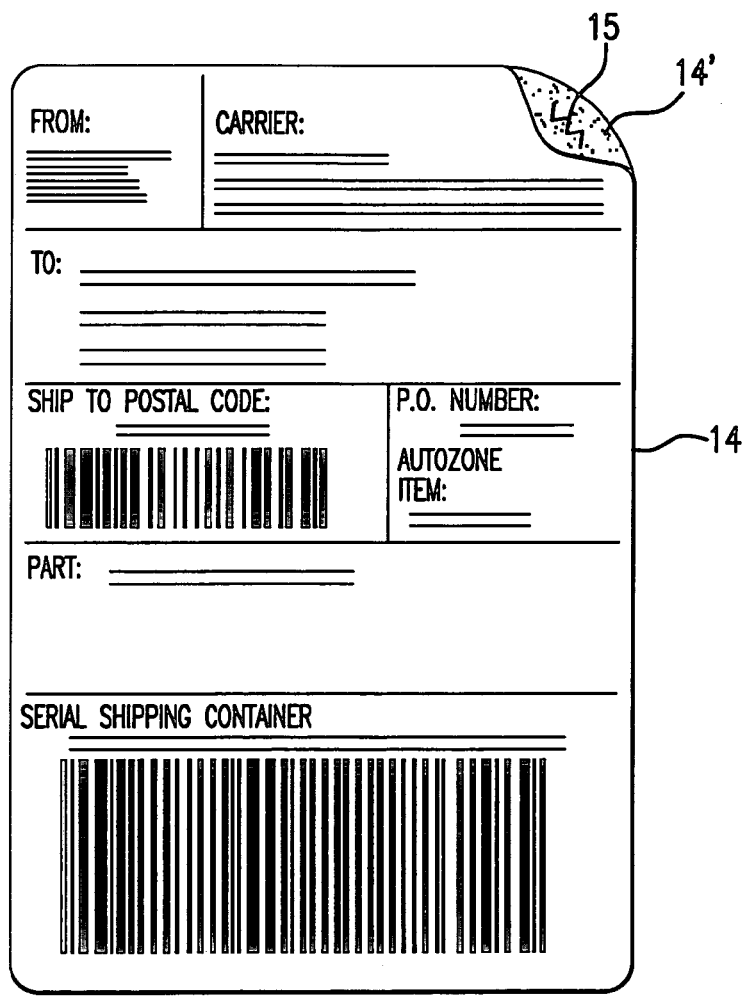
FIG. 2 is a plan view of the label shown in FIG. 1.

With reference to FIG. 1, there is shown a product package or load generally indicated at 10 having a plurality of individual packages or containers 11 of products loaded onto a pallet 12. The packages 11 and the pallet 12 are essentially completely covered with shrink wrap, a transparent plastics film material, indicated at 13 to hold the individual packages 11 against shifting on the pallet 12. A pressure sensitive label 14 having a pressure sensitive adhesive 14' (FIG. 2) on its underside is adhesively adhered to the outside of the shrink wrap 13. The adhesive 14' is preferably a permanent type adhesive which adheres tenaciously to the shrink wrap 13. An RFID transponder 15 on label 14, preferably on the underside of the label 14 between the label 14 and the shrink wrap 13. The label 14 may be referred to as a shipping label or a load label. The label 14 may also be located on one of the packages 11 under the shrink wrap 13. The load label 14 is shown in FIG. 2 and has various fields requiring certain shipping information or data as illustrated.

Figure 3:
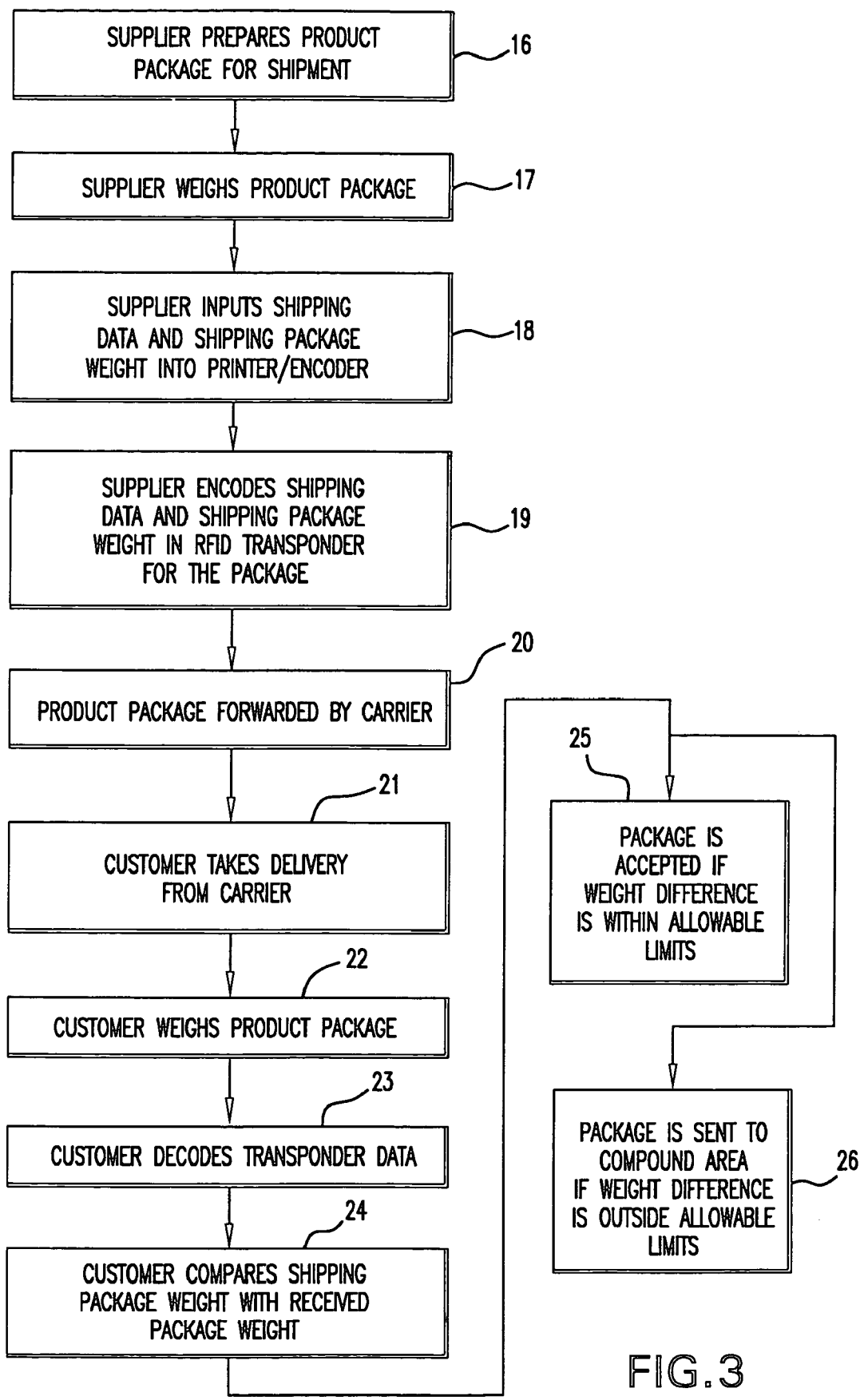
FIG. 3 is a flow chart illustrating one embodiment of the method of the invention.

In one specific embodiment illustrated in FIG. 3, the supplier prepares the product package 10 for shipment as indicated at 16. The package or load 10 can comprise a single product or container, or it can comprise multiple products or containers as shown at 11 in FIG. 1. The packaged product 10 is weighed as shown at 17 and the weight data or shipping package weight is then inputted into an RFID printer/encoder as indicated at 18. The shipping data can also be inputted or encoded directly into the transponder. Next the supplier prints some or all of the shipping data in the selected fields on the shipping label and electromagnetically encodes or writes the shipping package weight and, if desired, the shipping data into the transponder 15 as indicated at 19. This can be performed in an RFID printer sold by Paxar Americas, Inc. depicted in U.S. patent application Ser. No. 10/873,979 filed Jun. 22, 2004. If desired, the weight data can be inputted from a scale directly to a printer/encoder where the weight data can be written into the transponder, either with or without the shipping data. Next the load 10 is typically taken by the common carrier for transport to the customer as indicated at 20. However, the load 10 may pass through numerous hands before reaching the customer, thereby affording thieves numerous opportunities to remove some of the contents of the load. For example, the common carrier may collect the load 10 from the supplier and truck it to the trucker's consolidation terminal, and from there it may be trucked to a customer's distribution warehouse, and from there the product package may be trucked to the customer's place of business. After the customer takes delivery of the product package 10 as indicated at 21, the customer weighs the product package 10 as indicated at 22. For security reasons, the weight data may be encoded solely in the transponder 15, the thus the weight data is not visible or readily accessible to a would-be thief. The customer can decode the transponder 15 to retrieve the weight data therein as indicated at 23. In that the customer now has both the weight data of the received product package 10 and the weight data stored in the transponder 15, the customer can compare the two pieces of data as indicated at 24 and decide whether or not the difference between the two pieces of data is within allowable limits as indicated at 25 or is outside allowable limits as indicated at 26.

One of the advantages of this RFID-based security system is that the process is automatable in a computer-connected arrangement, virtually eliminating lost time and a source of human error.

The weight data can be derived from a scale that can input the weight data into a computer according to block 22, and the weight data from the transponder 15 can be inputted into the same computer according to block 23. The computer can be programmed to compare the two pieces of weight data. The allowable difference can be predetermined both as to actual differences and/or as to a percentage difference. For example, a decision can be made that a weight difference equaling up to plus or minus one kilogram can be within allowable limits, but any greater difference may indicate tampering. Alternatively, if the difference is no more than plus or minus one-quarter percent, then the difference is within allowable limits, but any greater percentage difference may indicate tampering. Also, the computer can be programmed to indicate tampering if the difference is greater either than a certain weight, e.g., one kilogram, or a certain percentage, e.g., one-quarter percent. If the received product package is within allowable limits, the product package 10 can be opened or routed to other handling stations or locations. If the received product package 10 is outside allowable limits, the product package 10 can be sent to a compound or quarantine area where tampering can be documented for insurance and/or law enforcement purposes before the product package 10 is opened.

While the steps in blocks 16 through 26 are illustrative, they are not to be considered limiting because this disclosure is more extensive than the flow chart of FIG. 3. For example, the shipping data need not be inputted into the transponder 15 if desired, and the weight data can be inputted to the computer or the computer printer directly from the scale used to weight the product package 10 according to block 17. Also, the customer can decode the transponder 15 before or simultaneously with weighing of the delivered product package 10. Once the weight of the delivered product package 10 is ascertained and the RFID transponder 15 is decoded, the customer can compare the two weights and determine for himself/herself without the use of any aid such as a computer whether or not the product package 10 may have been tampered with.

While it is preferred that the RFID transponder be part of a pressure sensitive label, the RFID transponder can be suitably incorporated into the package carton or it can be on the product per se.

Other embodiments and modifications of the invention will suggest themselves to those skilled in the art, and all such of these as come within the spirit of this invention are included within its scope as best defined by the appended claims.

I claim:

1. Method for detecting tampering, comprising: weighing a packaged product, providing an RFID transponder on the product or its packaging encoded with the shipping package weight of the packaged product, shipping the packaged product for delivery to a customer, weighing the packaged product after delivery to the customer, decoding the shipping package weight stored in the RFID transponder, and comparing the shipping package weight decoded from the RFID transponder with the received package weight to indicate tampering when the difference between the shipping package weight and the received package weight is outside allowable limits.

2. Method for detecting tampering, comprising: weighing a packaged product, encoding an RFID transponder with the shipping package weight for use on the packaged product, shipping the packaged product with the RFID transponder, weighing the packaged product after delivery to the customer, decoding the shipping package weight in the RFID transponder, and comparing the shipping package weight decoded from the transponder with the received package weight to indicate tampering when the difference between the shipping package weight and the received package weight is outside allowable limits.

3. Method for detecting tampering, comprising: weighing a packaged product, providing a pressure sensitive label having an RFID transponder, printing shipping data on the label and encoding the RFID transponder with the shipping package weight, applying the label to the product or its packaging, shipping the packaged product with the RFID transponder, weighing the packaged product after delivery to the customer, decoding the shipping package weight in the RFID transponder, and comparing the shipping package weight decoded from the RFID transponder with the received package weight to indicate tampering when the difference between the shipping package weight and the received package weight is outside allowable limits.

4. Method for detecting tampering comprising receiving a package from a carrier bearing an RFID transponder encoded with the shipping package weight, weighing the package to establish the received package weight, decoding the shipping package weight encoded in the RFID transponder, and comparing the shipping package weight decoded from the RFID transponder with the received package weight to indicate tampering when the difference between the shipping package weight and the received package weight is outside allowable limits.

5. Method as defined in claim 1, including the step of:
assembling a plurality of products on a pallet to provide a packaged product.

6. Method as defined in claim 2, including the step of:
assembling a plurality to products on a pallet to provide a packaged product.

7. Method as defined in claim 3, including the step of:
assembling a plurality to products on a pallet to provide a packaged product.

8. Method as defined in claim 4, including the step of:
assembling a plurality to products on a pallet to provide a packaged product.

* * * * *

UNITED STATES PATENT AND TRADEMARK OFFICE
CERTIFICATE OF CORRECTION

PATENT NO. : 7,096,151 B2 Page 1 of 1
APPLICATION NO. : 10/935385
DATED : August 22, 2006
INVENTOR(S) : Rudolph J. Klein It is certified that error appears in the above-identified patent and that said Letters Patent is hereby corrected as shown below:

In the claims,

Col. 4, claim 6, line 42, "to" should be -- of --.

Col. 4, claim 7, line 45, "to" should be -- of --.

Col. 4, claim 8, line 49, "to" should be -- of --.

Signed and Sealed this

Twentieth Day of March, 2007

JON W. DUDAS
*Director of the United States Patent and Trademark Office*